United States Patent
Pannell

(10) Patent No.: US 11,192,970 B2
(45) Date of Patent: Dec. 7, 2021

(54) POLYMERIZATION PROCESS

(71) Applicant: ExxonMobil Chemical Patents Inc., Baytown, TX (US)

(72) Inventor: Richard B. Pannell, Liberty, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 321 days.

(21) Appl. No.: 16/336,992

(22) PCT Filed: Sep. 7, 2017

(86) PCT No.: PCT/US2017/050431
§ 371 (c)(1),
(2) Date: Mar. 27, 2019

(87) PCT Pub. No.: WO2018/063765
PCT Pub. Date: Apr. 5, 2018

(65) Prior Publication Data
US 2019/0218319 A1 Jul. 18, 2019

Related U.S. Application Data

(60) Provisional application No. 62/400,261, filed on Sep. 27, 2016.

(30) Foreign Application Priority Data

Nov. 10, 2016 (EP) .................................. 16198127

(51) Int. Cl.
| | | |
|---|---|---|
| *C08F 210/16* | (2006.01) | |
| *C08F 2/34* | (2006.01) | |
| *C08K 5/01* | (2006.01) | |
| *C08F 10/02* | (2006.01) | |
| *C08F 4/24* | (2006.01) | |
| *C08F 4/80* | (2006.01) | |
| *C08F 4/14* | (2006.01) | |

(52) U.S. Cl.
CPC .............. *C08F 210/16* (2013.01); *C08F 2/34* (2013.01); *C08F 4/14* (2013.01); *C08F 4/24* (2013.01); *C08F 4/80* (2013.01); *C08F 10/02* (2013.01); *C08K 5/01* (2013.01); *C08F 2500/01* (2013.01); *C08F 2500/12* (2013.01)

(58) Field of Classification Search
CPC ...... C08F 210/16; C08F 2/34; C08F 2500/12; C08K 5/01
See application file for complete search history.

(56) References Cited

U.S. PATENT DOCUMENTS

| | | |
|---|---|---|
| 5,352,749 A | 10/1994 | DeChellis et al. |
| 5,453,471 A | 9/1995 | Bernier et al. |
| 6,063,877 A | 5/2000 | Kocian et al. |
| 6,262,192 B1 | 7/2001 | Wu |
| 6,391,985 B1 | 5/2002 | Goode et al. |
| 6,759,489 B1 | 7/2004 | Turkistani |
| 7,531,606 B2 | 5/2009 | Hendrickson |
| 7,683,140 B2 | 3/2010 | Pannell et al. |
| 7,696,289 B2 | 4/2010 | Fischbuch et al. |
| 7,858,719 B2 | 12/2010 | Hagerty et al. |
| 2005/0137364 A1 | 6/2005 | Cai et al. |
| 2005/0182207 A1* | 8/2005 | Singh ............... C08F 10/02 526/68 |
| 2005/0267268 A1 | 12/2005 | Hendrickson |
| 2005/0267269 A1 | 12/2005 | Hagerty et al. |
| 2007/0265400 A1 | 11/2007 | Fischbuch et al. |
| 2012/0041164 A1 | 2/2012 | Kolb et al. |
| 2016/0031244 A1 | 2/2016 | Miller |

FOREIGN PATENT DOCUMENTS

| | | |
|---|---|---|
| WO | 94/28032 A | 12/1994 |
| WO | 01/49750 A | 7/2001 |
| WO | 2011/147539 A | 12/2011 |
| WO | 2016/086006 A | 6/2016 |
| WO | 2016/182920 A | 11/2016 |

OTHER PUBLICATIONS

U.S. Appl. No. 62/400,250, filed Sep. 27, 2016.

* cited by examiner

*Primary Examiner* — Catherine S Branch
(74) *Attorney, Agent, or Firm* — ExxonMobil Chemical Patents Inc.-Law Department

(57) ABSTRACT

A process including contacting one or more monomers, at least one catalyst system, and a condensing agent including propane and isobutane under polymerizable conditions to produce a polyolefin polymer is provided.

16 Claims, No Drawings

POLYMERIZATION PROCESS

PRIORITY CLAIM

This application is a National Phase Application claiming priority to PCT Application Serial No. PCT/US2017/050431 filed Sep. 7, 2017, which claims priority to and benefit of U.S. Provisional Ser. No. 62/400,261 filed Sep. 27, 2016, and EP 16198127.9, filed Nov. 10, 2016, which are incorporated by reference in their entirety.

CROSS-REFERENCE TO RELATED APPLICATIONS

The present application is related to U.S. Provisional Application No. 62/400,258, filed Sep. 27, 2016, entitled "Polymerization Process", and U.S. Provisional Application No. 62/400,250, filed Sep. 27, 2016, entitled "Polymerization Process" both of which are incorporated by reference.

FIELD OF THE INVENTION

The disclosure relates to polymerization processes for the production of polyolefin polymers. In particular, the disclosure relates to gas phase polymerization processes that employ certain condensing agents.

BACKGROUND OF THE INVENTION

The condensing mode of operation in gas phase polymerization reactors significantly increases the production rate by providing extra heat-removal capacity through the evaporation of condensates in the cycle gas. Additional condensation is often promoted to extend the utility of condensed mode operation by adding an inert condensing agent ("ICA") into the reactor. The most commonly used ICA's in commercial practice are n-pentane, isopentane, n-butane, isohexane, and isobutane. The amount of ICA that can be introduced into the reactor; however, must be kept below the "stickiness limit" beyond which the bed material becomes too sticky to discharge or to maintain a normal fluidization status. Running in excess of this limit will result in different types of fouling or sheeting in various locations in the reactor system. The primary limitation on increasing the reaction rate in a fluidized bed reactor is the rate at which heat can be removed from the polymerization zone. For example, commercial applications raise isopentane concentration to the maximum allowable levels but no higher so as to avoid expanded dome section sheeting or agglomeration of polymer particles in a gas phase reactor.

An additional limitation arises in commercial applications where the maximum production rate for lower density polymers is sufficiently different from the production rate for higher density polymers, such that downstream extruder turndown limitations require costly or impractical workarounds, e.g., building multiple smaller extruders (less efficient) instead of one large extruder or operating an extruder intermittently.

Yet another limitation arises in the context of achieving higher production rates in existing facilities that have physical design characteristics, such as maximum operating pressure, that can limit production rate.

Past endeavors have attempted to improve on this technology by providing higher production rates for longer continuous run times and to bring the production rates for lower density polymers closer to the rates for higher density polymers.

U.S. Pat. No. 5,352,749, is directed to a process for polymerizing alpha-olefin(s) in a gas phase reactor having a fluidized bed and a fluidizing medium wherein the fluidizing medium serves to control the cooling capacity of said reactor. A description of condensable fluids is provided in Col. 6, lines 31-47.

U.S. Pat. No. 6,063,877 is directed to a process for controlling a continuous gas phase exothermic process in a reactor to maintain a constant temperature differential ($\Delta T$) between the temperature of reactor inlet and reactor bed or outlet by using a heat exchanger and flow of a condensable fluid to the reactor. Examples of condensable fluids are listed in Col. 2, lines 24-34.

U.S. Pat. No. 7,696,289 is directed to a gas phase polymerization process utilizing a low molecular weight dew point increasing component and a high molecular weight dew point increasing component. ICA's are described, for example, at Col. 15, lines 34-45, and claim 5.

U.S. Pat. No. 7,858,719 is directed to a gas phase process for polymerizing one or more hydrocarbon monomer(s) in a reactor in the presence of a catalyst system and a fluorinated hydrocarbon. A number of fluorinated hydrocarbons under the section header, "Condensable Fluids," may be found in Col. 19 to Col. 21.

U.S. Publication No. 2005/0182207 is directed to a continuous gas fluidized bed polymerization process for the production of a polymer from a monomer using at least two inert condensing agents selected from the group consisting of alkanes, cycloalkanes, and mixtures thereof, each of the inert condensing agents having a normal boiling point less than 40° C. Table 1 provides a listing of ICA's.

PCT Application No. PCT/US2016/031244 is directed to gas phase polymerization processes that employ certain condensing agents, including 2,2-dimethylpropane.

Other background references include WO 94/28021; WO 94/28032; WO 2011/147539; and U.S. Pat. Nos. 5,453,471; 6,262,192; 7,683,140; and 7,531,606.

Despite these past endeavors, there is a need and desire to increase production rates while maintaining the continuity of the reactor system in a continuous process. Additionally, there is also a desire to broaden the polymer grade operating windows to produce polymers with different properties at higher production rates, for example, decreasing the density or raising the melt index of the polymer, which was not previously possible with current commercial practices due to the limitations of process conditions and readily available ICA's. Further, there is a desire to produce lower density polymer ($\leq 0.912$ g/cm$^3$) at production rates closer to higher density polymer (e.g., 0.918 g/cm$^3$) production rates in order to avoid complexity in commercial facilities such as extruder turndown limitations. Finally, there is a desire to achieve these results when existing facility design (such as reactor max operating pressure) limits production rate.

SUMMARY OF THE INVENTION

The invention relates to a polymerization process, the process comprising contacting one or more monomers, at least one catalyst system, and a condensing agent comprising propane and isobutane under polymerizable conditions to produce a polyolefin polymer. It has been discovered that utilizing propane and isobutane allows for increased production rate for a broad range of polymers. The invention also relates to a polymerization process, the process comprising contacting one or more monomers, at least one catalyst system, and a condensing agent comprising propane and isobutane under polymerizable conditions to produce a polyolefin polymer; wherein the production rate of the polyolefin polymer is at least 5% greater than the same process polymerizing with a condensing agent consisting essentially of isopentane.

When expressed on a per unit of reactor volume basis, the production rate is called the "space time yield". In some embodiments, the polyolefin density (ASTM D1505) is ≤0.912 g/cm³ and the space time yield is >14.0 lb/ft³/hr (224 kg/m³/hr). In some embodiments, the space time yield is >17.5 lb/ft³/hr (280 kg/m³/hr).

Some embodiments are particularly advantageous to avoid extruder turndown problems between grades. In some embodiments, the production rate when producing a polyolefin polymer having density ≤0.912 g/cm³ is ≥80% of the production rate when producing a polyolefin polymer having a density ≥0.918 g/cm³.

It has been further discovered that such rates are achievable at lower reactor operating pressures when the condensing agent comprises propane and isobutane. While capable of operating across a broad range of reactor pressure, a particularly advantageous aspect of the invention relates to achieving increased production rates at reactor pressure from 20 to 24 barg.

Other embodiments of the invention will be apparent as from the description and claims in the following disclosure.

DETAILED DESCRIPTION OF THE INVENTION

Before the present compounds, components, compositions, and/or methods are disclosed and described, it is to be understood that unless otherwise indicated, this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a", "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

The invention is generally directed toward polymerization processes, particularly, gas phase processes, for polymerizing one or more monomer(s) in the presence of at least one catalyst system. The invention also relates in several classes of embodiments to polymerization processes having increased production rates and/or product capabilities.

The polymerization processes described herein may be a continuous process. As used herein, "a continuous process" is a process that operates (or is intended to operate) without interruption or cessation but of course may be interrupted for customary maintenance or for the occasional disrupting event. For example, a continuous process to produce a polymer would be one in which the reactants are continuously introduced into one or more reactors and polymer product is continually or semi-continually withdrawn.

In many classes of embodiments of the invention, the invention provides for a gas phase process for polymerizing one or more monomer(s) in the presence of at least one catalyst system and a condensable agent wherein the process is operated in a condensed mode.

For example, in some embodiments, the invention provides for a polymerization process, the process comprising contacting one or more monomers, at least one catalyst system, and a condensing agent comprising propane and isobutane under polymerizable conditions to produce a polyolefin polymer. In embodiments, a majority of the condensing agent comprises propane and isobutane. In other embodiments, the condensing agent consists essentially of propane and isobutane. As used herein, "a majority of the condensing agent" shall refer to >50 mol %, for example, >60, >70, >75, >80, >85, >85, or ≥90 mol %, based upon the total moles of condensing agent in the reactor. As used herein, a "consisting essentially of propane and isobutane" in the condensing agent shall refer to the sum of isobutane and propane molar concentrations is >90 mol %, for example, >92, >94, >95, >96, >98 mol %, based upon the total moles of condensing agent in the reactor.

The condensing agent can comprise from 1 to 99 mol % isobutane and from 99 to 1 mol % propane. The condensing agent can comprise ≥10 mol % isobutane, for example, ≥20, ≥25, ≥30, ≥40, ≥50, ≥60, ≥70, ≥80, ≥90 mol % isobutane, and <90 mol % propane, for example, <80, <75, <70, <60, <50, <40, <30, <20, <10 mol % propane. The condensing agent can comprise ≥10 mol % propane, for example, ≥20, ≥25, ≥30, ≥40, ≥50, ≥60, ≥70, ≥80, ≥90 mol % propane, and <90 mol % isobutane, for example, <80, <75, <70, <60, <50, <40, <30, <20, <10 mol % isobutane.

In certain preferred embodiments, the condensing agent comprises ≥20 mol % isobutane and <80 mol % propane. In other preferred embodiments, the condensing agent comprises ≥50 mol % of isobutane and <50 mol % propane.

The molar ratio of isobutane to propane in the condensing agent is from 0.01 to 100, preferably from 0.1 to 10, more preferably from 0.2 to 8. In embodiments, the molar ratio of isobutane to propane in the condensing agent is ≥0.1, for example, ≥0.2, ≥0.3, ≥0.5, ≥0.7, ≥1.0, ≥1.3, ≥1.5, ≥2.0, ≥2.2, ≥2.5, ≥3.0, ≥3.3, ≥3.5, ≥3.7, ≥4.0, ≥4.5, or ≥5.0.

Application U.S. 62/400,250 entitled "Polymerization Process", which is incorporated by reference herein, describes benefits of inventions related to condensing agents comprising propane, including condensing agents comprising a majority or even consisting essentially of propane. It has been surprisingly found that utilizing propane as a condensing agent allows increased production rates over conventional condensing agents such as isopentane. Without being bound by any theory, it is believed this is because isopentane depresses the polymer meltpoint more than propane when used as condensing agent. It is believed the reduced meltpoint depression provided by propane allows for higher production rates before "stickiness limits" are encountered.

However, it has been identified that in certain circumstances when using propane as condensing agent, the increased production rates are achieved at high reactor pressures. Advantageously, it has been discovered that condensing agents comprising propane and isobutane achieve increased production rates over rates achievable using isopentane, and do so at lower reactor pressures. Without being bound by any theory, it is believed that isobutane depresses the polymer meltpoint more than propane when used as condensing agent but not so much as isopentane. It is believed the increased meltpoint depression provided by an isobutane and propane blend (over propane alone) allows for obtaining higher production rates at lower reactor pressures before "stickiness limits" are encountered. In other words, it has been surprisingly discovered that adding isobutane to a propane-based condensing agent mixture lowers the total reactor pressure required to achieve increased production rates.

In certain embodiments, the process comprises contacting one or more monomers, at least one catalyst system, and a condensing agent comprising propane and isobutane under polymerizable conditions to produce a polyolefin polymer; wherein the production rate of the polyolefin polymer is at least 5% greater than the same process polymerizing with a condensing agent consisting essentially of isopentane. As used herein, "the same process" shall refer to any gas phase process producing similar polymer products using comparable equipment. However, it shall not exclude the presence of or omission of other variances, steps, elements, equipment, or materials, whether or not, specifically mentioned. As used herein, "production rate" shall refer to a mass of polymer produced per unit of time with units, for example, lb/hr, metric tons/hr (T/hr) or kg/hr. As used herein, a "consisting essentially of isopentane" in the condensing agent shall refer to >90 mol %, for example, >92, >94, >95, >96, >98 mol %, based upon the total moles of condensing agent in the reactor.

In some embodiments, the production rate is at least 10, 15, 20, 25, 30, 35, 40, 45, 50, 55, 60, 65, or 70% greater than the same process polymerizing with a condensing agent consisting essentially of isopentane.

When expressed on a per unit of reactor volume basis, the production rate is called the "space time yield". As used herein, "space time yield" refers to production rate expressed on a per unit of reactor volume basis with units, for example, lb/hr/ft³ (equivalent to units lb/ft³/hr) or kg/hr/m³. In some embodiments, the polyolefin density (ASTM D1505) is ≤0.912 g/cm³ and the space time yield is >14.0 lb/ft³/hr (224. kg/m³/hr). For example, the density is ≤0.912 g/cm³ and the space time yield is >14.5, >15, >16, >17, >18, >19, >20, or >21 lb/ft³/hr (>232, >240, >256, >272, >288, >304, >320, or >336 kg/m³/hr). As used herein, polyolefin or polymer density is measured by ASTM D1505.

In some embodiments, the space time yield is >17.5 lb/ft³/hr (280. kg/m³/hr). For example, the space time yield is >18, >19, >20, >21, or >22 lb/ft³/hr (>288, >304, >320, >336, or >352 kg/m³/hr).

It has additionally been discovered that using propane and isobutane in condensing agent broaden the operating window allowing lower density polymers to be produced at rates similar to rates when producing higher density polymers. Similarly, using propane and isobutane as condensing agent allows higher melt index (MI) polymers to be produced at rates similar to rates when producing lower MI polymers. Notwithstanding this advantageous result, it has been observed that adding isobutane to a propane-based condensing agent results in some narrowing of the operating window over propane-only condensing agent. Nevertheless, such relatively equivalent production rates (i.e., such broad operating window) were not previously achievable with conventional condensing agents such as isopentane. Additionally, these equivalent rates (i.e., broader than isopentane but slightly narrower than propane-only operating window) are achievable at lower total reactor pressures than with propane-only condensing agent.

In some embodiments, the process using propane and isobutane condensing agents can have a production rate when producing a polyolefin polymer having density ≤0.912 g/cm³ that is ≥80% of the production rate when producing a polyolefin polymer having a density ≥0.918 g/cm³, density measured by ASTM D1505. For example, the production rate when producing a polyolefin polymer having density ≤0.912 g/cm³ can be ≥85, ≥90%, ≥92%, ≥94% of the production rate when producing a polyolefin polymer having a density ≥0.918 g/cm³.

Catalyst Components and Catalyst Systems

All polymerization catalysts including conventional-type transition metal catalysts are suitable for use in the polymerization processes of the invention. The following is a non-limiting discussion of the various polymerization catalysts useful in the process of the invention. All numbers and references to the Periodic Table of Elements are based on the new notation as set out in Chemical and Engineering News, 63(5), 27 (1985), unless otherwise specified.

In the description herein, the transition metal compound may be described as a catalyst precursor, a transition metal catalyst, a polymerization catalyst, or a catalyst compound, and these terms are used interchangeably. The term activator is used interchangeably with the term co-catalyst. As used herein, "at least one catalyst system" refers to a combination comprising a catalyst compound and an activator capable of polymerizing monomers.

Conventional Catalysts

Conventional catalysts generally known in the art refer to Ziegler Natta catalysts or Phillips-type chromium catalysts. Examples of conventional-type transition metal catalysts are discussed in U.S. Pat. Nos. 4,115,639; 4,077,904; 4,482,687; 4,564,605; 4,721,763; 4,879,359; and 4,960,741. The conventional catalyst compounds that may be used in the present invention include transition metal compounds from Groups 3 to 10, preferably 4 to 6 of the Periodic Table of Elements.

These conventional-type transition metal catalysts may be represented by the formula:

$$MR_x$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional chrome catalysts, often referred to as Phillips-type catalysts, may include $CrO_3$, chromocene, silyl chromate, chromyl chloride ($CrO_2Cl_2$), chromium-2-ethylhexanoate, chromium acetylacetonate ($Cr(AcAc)_3$). Non-limiting examples are disclosed in U.S. Pat. Nos. 2,285,721; 3,242,099; and 3,231,550.

For optimization, many conventional catalysts require at least one cocatalyst. A detailed discussion of cocatalysts may be found in U.S. Pat. No. 7,858,719, Col. 6, line 46, bridging Col. 7, line 45.

Metallocene Catalysts

Polymerization catalysts useful in embodiments of the invention include one or more metallocene compounds (also referred to herein as metallocenes or metallocene catalysts). Metallocene catalysts are generally described as containing one or more ligand(s) and one or more leaving group(s) bonded to at least one metal atom, optionally with at least one bridging group. The ligands are generally represented by one or more open, acyclic, or fused ring(s) or ring system(s)

or a combination thereof. These ligands, preferably the ring(s) or ring system(s) are typically composed of one or more atoms selected from Groups 13 to 16 atoms of the Periodic Table of Elements; preferably, the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structures such as a pentadiene, a cyclooctatetraendiyl, or an imide ligand. The metal atom is preferably selected from Groups 3 through 15 and the lanthanide or actinide series of the Periodic Table of Elements. Preferably, the metal is a transition metal from Groups 4 through 12, more preferably Groups 4, 5 and 6, and most preferably the transition metal is from Group 4.

Exemplary metallocene catalysts and catalyst systems are described in for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753; 5,770,664; EP-A-0 591 756; EP-A-0 520-732; EP-A-0 420 436; EP-B1 0 485 822; EP-B1 0 485 823; EP-A2-0 743 324; EP-B1 0 518 092; WO 91/04257; WO 92/00333; WO 93/08221; WO 93/08199; WO 94/01471; WO 96/20233; WO 97/15582; WO 97/19959; WO 97/46567; WO 98/01455; WO 98/06759; and WO 98/011144.

Mixed Catalysts

In a class of embodiments of the invention, the at least one catalyst system may comprise a mixed catalyst, i.e., two or more of the same or different types of catalysts, such as the ones described above. For example, a metallocene catalyst may be combined with one or more of a conventional catalysts or advanced catalysts known in the art. An example of such catalyst is PRODIGY™ Bimodal Catalyst available from Univation Technologies, LLC, Houston, Tex.

Activator and Activation Methods

The above described polymerization catalysts, particularly, metallocene catalysts, are typically activated in various ways to yield polymerization catalysts having a vacant coordination site that will coordinate, insert, and polymerize olefin(s).

As used herein, the term "activator" refers to any compound that can activate any one of the polymerization catalyst compounds described herein by converting the neutral polymerization catalyst compound to a catalytically active catalyst cation compound. Non-limiting activators, for example, include alumoxanes, aluminum alkyls, ionizing activators, which may be neutral or ionic, and conventional-type cocatalysts. A detailed discussion of activators and activation methods may be found in U.S. Pat. No. 7,858,719, Col. 14, line 21, bridging Col. 17, line 30.

Method for Supporting

The above described catalysts and catalyst systems may be combined with one or more support materials or carriers using one of the support methods well known in the art. In several classes of embodiments of the invention, the at least one catalyst system is in a supported form.

As used herein, the terms "support" or "carrier" are used interchangeably and are any porous or non-porous support material, preferably, a porous support material, for example, talc, inorganic oxides and inorganic chlorides, for example silica or alumina. Other carriers include resinous support materials such as polystyrene, a functionalized or cross-linked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13, or 14 metal oxides. The preferred supports include silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

Examples of supported metallocene catalyst systems are described in U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965: 5,554,704; 5,629,253; 5,639,835; 5,625,015; 5,643,847; 5,648,310; 5,665,665; 5,698,487; 5,714,424; 5,723,400; 5,723,402; 5,731,261; 5,743,202; 5,759,940; 5,767,032; 5,688,880; 5,770,755; and 5,770,664; WO 95/32995; WO 95/14044; WO 96/06187; WO 96/11960; and WO 96/00243.

Examples of supported conventional catalyst systems are described in U.S. Pat. Nos. 4,894,424; 4,376,062; 4,395,359; 4,379,759; 4,405,495; 4,540,758; and 5,096,869.

Polymerization Process

Embodiments of the at least one catalyst system described above are suitable for use in any gas phase polymerization process, including fluidized bed or stirred bed processes. Particularly preferred is a gas phase polymerization process in which one or more condensable agent as described below is utilized.

Typically in a gas phase polymerization process, a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of at least one catalyst system under polymerizable conditions. As used herein, "polymerizable conditions" refers to any and all process conditions and any and all equipment necessary and suitable to polymerize olefins into polyolefins. In a preferred class of embodiments of the invention, a condensable agent as described below, is introduced to the process for purposes of increasing the cooling capacity of the recycle stream. The purposeful introduction of a condensable agent with the recycle stream temperature below the recycle stream dew point into a gas phase process is referred to as a "condensed mode process" discussed in greater detail below. The gaseous stream is withdrawn from the fluidized bed and recycled back into the reactor. Simultaneously, polymer product is withdrawn from the reactor and fresh reactants including monomers are added to the reactor. See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, and also the Background section of this application.

Condensing Agent(s)

Condensing agents or fluids generally include hydrocarbons having little to no solvent power regarding the polymer product(s). Suitable condensing agents include $C_3$-$C_8$ hydrocarbons and mixtures thereof, preferably $C_3$-$C_6$ hydrocarbons and mixtures thereof, including linear, branched, cyclic, substituted hydrocarbons, as well as their respective isomers. In all embodiments of the invention, the condensing agent comprises propane.

In a class of embodiments of the invention, propane may be used with other condensing agents, for example, other $C_4$-$C_8$ condensing agents or mixtures thereof as described above. In particular, the condensing agent may comprise a mixture of propane and at least another $C_4$-$C_8$ condensing agent of the chemical formula $C_nH_{2n+2}$, where n is 4 to 8, e.g., n-butane, isobutane, n-pentane, isopentane, 2,2-dimethylpropane, n-hexane, isohexane, n-heptane, n-octane, or mixtures of two or more thereof. In an embodiment of the invention, the condensing agents comprise or consist essentially of propane and isobutane. In other embodiments, the condensing agent comprises propane and butane in combination with at least one other condensing agent.

Condensed Mode Process

The condensing agent may be used in a gas phase polymerization process or simply a gas phase process. The gas phase process is operated in a condensed mode where a condensing agent as described above is introduced to the process at a temperature below the dew point of the gas to increase the cooling capacity of the recycle stream. The gas phase process is particularly well-suited for polymerizing one or more olefin(s), preferably at least one of which is ethylene or propylene, in a fluidized bed reactor, the process operating in a condensed mode in which a liquid and a gas are introduced to the fluidized bed reactor having a fluidizing medium or a stirred bed reactor having a medium, wherein the level of condensable fluid, is greater than 5 weight percent, preferably, greater than 10 weight percent, or greater than 15 weight percent or greater than 20 weight percent, more preferably greater than 25 weight percent, based on the total weight of the liquid and gas entering the reactor. For further details of a condensed mode process see, for example, U.S. Pat. No. 5,436,304.

In one preferred embodiment of the invention, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst and a condensable fluid into the reactor; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In an embodiment, the condensable fluid is introduced in amounts greater than 10 weight percent or greater than 15 weight percent or greater than 20 weight percent, preferably greater than 25 weight percent, based on the total weight of fluidizing medium being reintroduced into the reactor.

Reactor Conditions

The reactor pressure in any of the gas phase processes described in the above embodiments vary from about 100 psig (0.69 barg) to about 500 psig (34.5 barg), preferably, in the range of from about 290 psig (20 barg) to about 420 psig (29 barg), more preferably, from about 290 psig (20 barg) to about 377 psig (26 barg). In preferred embodiments, the reactor pressure is in the range from about 290 psig (20 barg) to about 362 psig (25 barg). In most preferred embodiments, the reactor pressure is in the range from about 333 psig (23 barg) to about 362 psig (25 barg).

The reactor temperature in any of the gas phase processes described in the above embodiments vary from about 30° C. to about 120° C., preferably from about 60° C. to about 115° C., more preferably in the range of from about 70° C. to 110° C., and most preferably in the range of from about 70° C. to about 100° C. In another embodiment, the polymerization temperature is above ambient temperature (23° C.), preferably above 30° C., preferably above 50° C., preferably above 70° C.

In several classes of embodiments of the invention, the process produces greater than 500 lbs of polymer per hour (227 kg/hr) to about 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 100,000 lbs/hr (45,500 kg/hr), and most preferably greater than 65,000 lbs/hr (29,000 kg/hr) to greater than 200,000 lbs/hr (90,700 kg/hr).

Monomers and Polymers

Polymers produced are olefin polymers or "polyolefins". As used herein, "olefin polymers" or "polyolefin" refers to at least 75 mol % of the polymer is derived from hydrocarbon monomers, preferably at least 80 mol %, preferably at least 85 mol %, preferably at least 90 mol %, preferably at least 95 mol %, and preferably at least 99 mol %. Hydrocarbon monomers are monomers made up of only carbon and hydrogen. For example, the monomers to be polymerized are aliphatic or alicyclic hydrocarbons. (as defined under "Hydrocarbon" in Hawley's Condensed Chemical Dictionary, 13th edition, R. J. Lewis ed., John Wiley and Sons, New York, 1997). In another embodiment of the invention, the monomers to be polymerized are linear or branched alpha-olefins, preferably $C_2$ to $C_{40}$ linear or branched alpha-olefins, preferably $C_2$ to $C_{20}$ linear or branched alpha-olefins, e.g., ethylene, propylene, butene, pentene, hexene, heptene, octene, nonene, decene, undecene, dodecene, or mixtures thereof. Well-suited monomers include two or more olefin monomers of ethylene, propylene, butene-1, pentene-1, 4-methyl-pentene-1, hexene-1, heptene-1, octene-1, decene-1, and mixtures thereof.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, ethylidene norbornene, isoprene, dicyclopentadiene and cyclopentene.

In another embodiment of the invention, ethylene or propylene is polymerized with at least two different comonomers, optionally, one of which may be a diene, to form a terpolymer.

The polymers produced by the process of the invention are useful in making a wide variety of products and useful in many end-use applications. The polymers produced by the process of the invention include low density polyethylenes, linear low density polyethylenes, medium density polyethylene, and high density polyethylenes.

The polymers produced, typically polyethylene polymers, may have a ASTM D1505 density in the range of from 0.860 g/cc to 0.970 g/cc, preferably in the range of from 0.880 g/cc to 0.965 g/cc, more preferably in the range of from 0.905 g/cc to 0.940 g/cc, even more preferably in the range of from 0.905 g/cc to 0.920 g/cc, yet even more preferably in the range from 0.910 g/cc to 0.918 g/cc, and most preferably greater than 0.905 g/cc.

In one embodiment, the polymers produced by the process of the invention typically have a molecular weight distribution, a weight average molecular weight to number average molecular weight (Mw/Mn) of about 1.5 to about 30, particularly about 2 to about 15, more preferably about 2 to about 10, even more preferably about 2.2 to less than about 8, and most preferably from about 2.5 to about 8. The ratio of Mw/Mn is measured by gel permeation chromatography techniques well known in the art.

In several classes of embodiments of the invention, the polyethylene polymers typically have a narrow or broad composition distribution as measured by Composition Distribution Breadth Index (CDBI). Further details of determining the CDBI of a copolymer are known to those skilled in the art. See, for example, WO 93/03093. CDBI's may be generally in the range of greater than 50% to 99%, preferably in the range of 55% to 85%, and more preferably 60% to 80%, even more preferably greater than 60%, still even more preferably greater than 65%. Alternatively, CDBI's may be generally less than 50%, more preferably less than 40%, and most preferably less than 30%.

Polyethylene polymers may have a melt index (MI) or ($I_{2.16}$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. The polyethylene polymers may have a melt index ratio ($I_{21.6}/I_{2.16}$ or for a shorthand "$I_{21}/I_2$") (measured by ASTM-D-1238-F) of from 10 to less than 25, more preferably from about 15 to less than 25. Further, in another embodiment, the polymers have a melt index ratio ($I_{21}/I_2$) of from preferably greater than 25, more preferably greater than 30, even more preferably greater than 40, still even more preferably greater than 50, and most preferably greater than 65. Alternatively, the polyethylene polymers may have a melt index ratio ($I_{21}/I_2$) in the range of from 15 to 40, preferably in the range of from about 20 to about 35, more preferably in the range of from about 22 to about 30, and most preferably in the range of from 24 to 27.

In yet other embodiments of the invention, propylene based polymers may be produced. These polymers include without limitation atactic polypropylene, isotactic polypropylene, and syndiotactic polypropylene. Other propylene polymers include propylene random, block or impact copolymers.

Polymers produced by the processes of the invention are useful in forming a variety of articles. Such articles include without limitation films, sheets, and fibers. The articles may be produced by extrusion and co-extrusion as well as blow molding, injection molding, and rotational molding. Films include blown or cast films formed by coextrusion or by lamination, shrink film, cling film, stretch film, sealing films, and oriented films. The films are useful in packaging, heavy duty bags, grocery sacks, food packaging, medical packaging, industrial liners, geo-membranes, etc. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers, playground equipment, toys, etc.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

These examples model reactor operation that will use a variety of ICAs. Comparative examples C1 and C2 utilize conventional isopentane as a condensing agent whereas examples 1-7 and 8-14 utilize propane and isobutane blends. Modelling was done using methods shown in U.S. Pat. No. 7,683,140, Col. 62, row 48 bridging Col. 69, row 51. These examples use the same physical property sources as the aforementioned patent. These examples also employ the same exemplary calculation as used in U.S. Pat. No. 7,683,140 (see Table 3 in Col. 69). The examples demonstrate the ΔMIT. Table 1 shows the full set of solubility parameters used in these examples (Chemical Properties Handbook, 1999).

TABLE 1

| Solubility Parameters ((cal/cm$^3$)$^{1/2}$) | |
|---|---|
| Propane | 6.396 |
| Iso-Butane | 6.853 |
| Iso-Pentane | 6.771 |
| 1-Hexene | 7.352 |
| Polyethylene | 7.950 |

Table 2 defines the reactor conditions for all examples.

TABLE 2

| Reactor Conditions | |
|---|---|
| T Gas Inlet (° C.) | 49.0 |
| T Rx (Examples C1, 1-7) (° C.) | 85.0 |
| T Rx (Examples C2, 8-14) (° C.) | 80.0 |
| Rx P (Barg) | 20.0 |
| Plate + Bed ΔP (Bar) | 0.414 |
| SGV (m/sec) | 0.768 |
| Reactor Diameter (m) | 4.42 |
| Reactor Height (m) | 14.0 |

Once cycle gas concentrations are fixed, often based on reaching a target value for ΔMIT, the heat removal capacity of the cycle gas loop is calculated. For illustrative purposes, the reactor temperature remains fixed at 80 or 85° C. and the cycle gas temperature entering the reactor is fixed at a constant value of 40° C. These are typical values for a commercial plant, which uses cooling water to remove heat of polymerization. Calculations are based upon Soave-Redlich-Kwong thermodynamic properties. Example calculations are done based on fixed volumetric flowrate at reactor temperature, because commercial reactors are operated with this method to control particle carryover. Results of these calculations are illustrated in Tables 3(a) and 3(b).

TABLE 3(a)

| | Example | | | | | | | |
|---|---|---|---|---|---|---|---|---|
| | C1 | 1 | 2 | 3 | 4 | 5 | 6 | 7 |
| MI (g/10 min) | 1.00 | 1.00 | 1.00 | 1.00 | 1.00 | 1.00 | 1.00 | 1.00 |
| Density (g/cm$^3$) | 0.918 | 0.918 | 0.918 | 0.918 | 0.918 | 0.918 | 0.918 | 0.918 |
| Nitrogen (mol %) | 14.36 | 10 | 10 | 10 | 10 | 10 | 10 | 10 |
| Hydrogen (mol %) | 0.0186 | 0.0155 | 0.0155 | 0.0155 | 0.0155 | 0.0155 | 0.0155 | 0.0155 |
| Ethylene (mol %) | 67.25 | 56.04 | 56.04 | 56.04 | 56.04 | 56.04 | 56.04 | 56.04 |
| 1-Hexene (mol %) | 1.350 | 1.125 | 1.125 | 1.125 | 1.125 | 1.125 | 1.125 | 1.125 |
| Isopentane (mol %) | 15 | | | | | | | |
| n-Hexane (mol %) | 2.014 | 1.675 | 1.675 | 1.675 | 1.675 | 1.675 | 1.675 | 1.675 |
| Isobutane (mol %) | | 10 | 12 | 14 | 16 | 18 | 20 | 22 |
| Propane (mol %) | | 21.14 | 19.14 | 17.14 | 15.14 | 13.14 | 11.14 | 9.14 |
| Condensed (wt %) | 24.01 | 8.70 | 9.95 | 11.30 | 12.75 | 14.29 | 15.92 | 17.61 |
| Dew Point T (° C.) | 77.06 | 61.38 | 62.38 | 63.36 | 64.34 | 65.30 | 66.25 | 67.19 |
| ΔDew Point T (° C.) | 7.94 | 23.62 | 22.62 | 21.64 | 20.66 | 19.70 | 18.75 | 17.81 |
| Rate (T/hr) | 50.90 | 43.51 | 45.81 | 48.30 | 50.97 | 53.81 | 56.83 | 59.99 |
| STY (kg/m3/hr) | 236.6 | 202.3 | 213.0 | 224.5 | 236.9 | 250.2 | 264.2 | 278.9 |
| ΔMIT (° C.) | 6.11 | 3.89 | 4.10 | 4.32 | 4.53 | 4.74 | 4.95 | 5.15 |

TABLE 3(b)

| | Example | | | | | | | |
|---|---|---|---|---|---|---|---|---|
| | C2 | 8 | 9 | 10 | 11 | 12 | 13 | 14 |
| MI (g/10 min) | 1.00 | 1.00 | 1.00 | 1.00 | 1.00 | 1.00 | 1.00 | 1.00 |
| Density (g/cm$^3$) | 0.912 | 0.912 | 0.912 | 0.912 | 0.912 | 0.912 | 0.912 | 0.912 |
| Nitrogen (mol %) | 22.96 | 15 | 15 | 15 | 15 | 15 | 15 | 15 |
| Hydrogen (mol %) | 0.0195 | 0.0129 | 0.0129 | 0.0129 | 0.0129 | 0.0129 | 0.0129 | 0.0129 |
| Ethylene (mol %) | 60.74 | 46.70 | 46.70 | 46.70 | 46.70 | 46.70 | 46.70 | 46.70 |
| 1-Hexene (mol %) | 1.659 | 0.937 | 0.937 | 0.937 | 0.937 | 0.937 | 0.937 | 0.937 |
| Isopentane (mol %) | 12.13 | | | | | | | |
| n-Hexane (mol %) | 2.499 | 2.083 | 2.083 | 2.083 | 2.083 | 2.083 | 2.083 | 2.083 |
| Isobutane (mol %) | | 8 | 10 | 12 | 14 | 16 | 18 | 20 |
| Propane (mol %) | | 27.26 | 25.26 | 23.26 | 21.26 | 19.26 | 17.26 | 15.26 |
| Condensed (wt %) | 20.68 | 9.97 | 11.24 | 12.62 | 14.09 | 15.64 | 17.28 | 18.97 |
| Dew Point T (° C.) | 76.20 | 63.36 | 64.31 | 65.26 | 66.20 | 67.12 | 68.04 | 68.95 |
| ΔDew Point T (° C.) | 3.80 | 16.64 | 15.69 | 14.74 | 13.80 | 12.88 | 11.96 | 11.05 |
| Rate (T/hr) | 41.76 | 41.94 | 44.33 | 46.90 | 49.65 | 52.58 | 55.67 | 58.91 |
| STY (kg/m3/hr) | 194.1 | 195.0 | 206.1 | 218.0 | 230.8 | 244.5 | 258.8 | 273.9 |
| ΔMIT (° C.) | 6.65 | 5.19 | 5.40 | 5.62 | 5.83 | 6.04 | 6.24 | 6.45 |

The production rate increased with use of propane and isobutane as condensing agents in examples 4-7 compared to use of isopentane in corresponding comparative example C1. Likewise, the production rate increased in inventive examples 8-14 over isopentane condensing agent used in corresponding comparative example C2. Advantageously, the production rate for density 0.918 in example 7 was 18% higher than the production rate for density 0.918 in example C1 and the production rate for density 0.912 in example 14 was 42% higher than the production rate for density 0.912 in example 3, both examples 7 and 14 using propane and isobutane as condensing agents. Also advantageously, the ΔMIT for example 7 and 14 were lower when compared to use of isopentane in corresponding examples C1 and C2. Particularly advantageous, the reactor pressure for these increased production rate examples was relatively low at 20 barg.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points, even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc., are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polymerization process, the process comprising contacting one or more monomers, at least one catalyst system, and a condensing agent under polymerizable conditions including a condensed mode of operation in gas phase polymerization, to produce a polyolefin polymer; wherein the condensing agent comprises at least 20 mol % isobutane and at least 25 mol % propane, and further wherein the sum of isobutane and propane molar concentrations is >50 mol % based upon the total moles of condensing agent.

2. The process of claim 1, wherein the production rate of the polyolefin polymer is at least 5% greater than the same process polymerizing with a condensing agent consisting essentially of isopentane.

3. The process of claim 1, wherein the polyolefin density (ASTM D1505) is ≤0.912 g/cm$^3$ and the space time yield is >14.0 lb/ft$^3$/hr (224. kg/m$^3$/hr).

4. The process of claim 1, wherein the space time yield is >17.5 lb/ft$^3$/hr (280. kg/m$^3$/hr).

5. The process of claim 1, wherein the production rate when producing a polyolefin polymer having density ≤0.912 g/cm$^3$ is ≥80% of the production rate when producing a polyolefin polymer having a density ≥0.918 g/cm$^3$, density measured by ASTM D1505.

6. The process of claim 1, wherein the reactor pressure is from 20 to 29 barg.

7. The process of claim 1, wherein the reactor pressure is from 20 to 26 barg.

8. The process of claim 1, wherein the reactor pressure is from 20 to 25 barg.

9. The process of claim 1, wherein the condensing agent further comprises at least one additional $C_4$-$C_8$ condensing agent.

10. The process of claim 9, wherein the at least one additional $C_4$-$C_8$ condensing agent comprises n-butane, n-pentane, isopentane, 2,2-dimethylpropane, n-hexane, isohexane, n-heptane, n-octane, or mixtures thereof.

11. The process of claim 1, wherein the condensing agent consists essentially of propane and isobutane.

12. The process of claim 1, wherein the polyolefin polymer is a copolymer of ethylene and $C_3$-$C_{12}$ alpha-olefin.

13. The process of claim 1, wherein the polyolefin polymer is a copolymer of ethylene and $C_4$-$C_8$ alpha-olefin.

14. The process of claim 1, wherein the polyolefin polymer has a density from 0.905 g/cm$^3$ to 0.940 g/cm$^3$.

15. The process of claim 1, wherein the polyolefin polymer has a melt index ($I_{2.16}$) (ASTM D1238-E) from 0.25 dg/min to 50 dg/min.

16. The process of claim 1, wherein the at least one catalyst system comprises a Ziegler-Natta, chromium, chromium oxide, $AlCl_3$, cobalt, iron, palladium, vanadium, metallocene catalyst, group IV organometallic complex catalyst, or mixtures thereof.

* * * * *